Figures 1, 2:
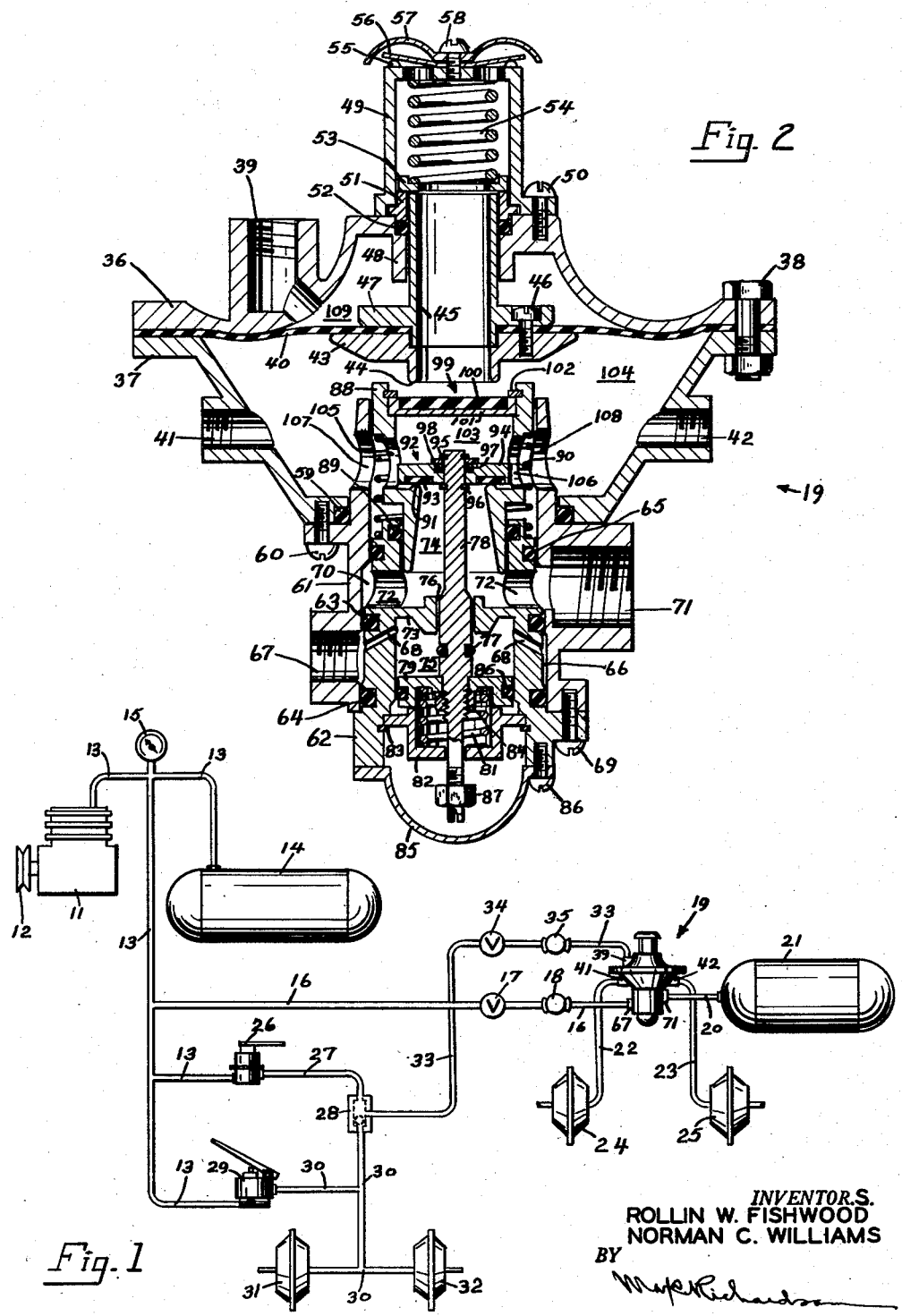

Dec. 4, 1956  R. W. FISHWOOD ET AL  2,772,926
EMERGENCY AIR RELAY VALVE
Filed Aug. 16, 1954

INVENTORS.
ROLLIN W. FISHWOOD
NORMAN C. WILLIAMS
BY

AGENT

United States Patent Office 2,772,926
Patented Dec. 4, 1956

2,772,926

EMERGENCY AIR RELAY VALVE

Rollin W. Fishwood, Vancouver, Wash., and Norman C. Williams, Portland, Oreg., assignors to Power Brake Equipment Company, Portland, Oreg., a corporation of Oregon Application August 16, 1954, Serial No. 449,831

4 Claims. (Cl. 303—63)

This invention relates generally to diaphragm type air relay valves as used in the pneumatic actuating systems of automotive truck brakes. More particularly this invention is an improved emergency air relay valve for mounting on the trailer of a truck-trailer combination not only for the purpose of relaying air from a storage tank to the trailer brake cylinders as indicated by the pressure of air in an operator controlled service line but also to set the trailer brakes with a pre-set pressure should the air supply line from the truck to the trailer be broken.

It should be understood that in a simple air brake system for a truck-trailer combination vehicle a storage tank on the truck is kept supplied with air by a pressure controlled air compressor and that a second storage tank on the trailer is normally connected to the truck tank through an appropriate valve port in an emergency air relay valve. It is a feature of these emergency air relay valves that the port connecting the two tanks will be quickly closed on loss of air pressure on the truck side. The air line leading from the truck tank through the above described port to the trailer tank is called the emergency line.

Commonly also a second air line, called a service line, leads from the truck tank to the emergency air relay valve through a foot operated throttle valve which bleeds air to the relay valve at a pressure dependent on throttle opening. In the simplest schemes the truck brake cylinders are connected to the service line.

The emergency air relay valves of the known prior art are adapted to apply air to the trailer brake cylinders from the emergency line and trailer tank at a pressure balanced with the pressure of the air in the service line and also in the emergency condition of a loss of pressure in the emergency line ahead of the emergency air relay valve to apply the full trailer tank pressure to the trailer brakes.

This sudden emergency application of the full trailer tank pressure to the trailer brakes as commonly done is a heroic treatment which is often unnecessary and many times dangerous since the condition of the road surface may be such that too much brake effort may cause the wheels to skid and actually to reduce the holding power of the wheels on the road. Again if the loss of emergency air is gradual, the severe emergency application of the trailer brakes may be made while there is still enough pressure in the truck tank to give power to the truck brakes and operate the trailer brakes normally at lower pressure.

It is a primary object of this invention to provide such an emergency air relay valve having a pre-set limit of air pressure to be supplied to the trailer brake cylinders on a reduction of emergency line pressure.

It is a second object to provide such an emergency relay valve having such a pre-set limit of air pressure application supplied to the trailer brake cylinders whether the reduction of emergency line pressure is slowly or rapidly made.

It is a third object to provide such an emergency relay valve having a pre-set limit of emergency air pressure application to the trailer brake cylinders without limiting the full range of air pressure application under normal throttle operation.

How these and other objects are attained will be explained in the following description referring to the attached drawing in which Figure 1 is a schematic diagram of a simple truck and trailer air brake system showing the location of our improved emergency air relay valve, and Figure 2 is a vertical section through our improved valve.

Like numerals of reference refer to like parts in the two figures of the drawing.

Referring now to Figure 1, an air compressor 11 driven by means not shown through a driven pulley 12 is understood to be equipped with driving and control means adapted to cause the compressor to supply air through air line 13 to truck mounted air storage tank 14 and to control the air pressure in tank 14 between pre-set limits as indicated on pressure gage 15. Emergency air line 16 including manual cut-off cock 17 and truck to trailer line coupling 18 connects line 13 from tank 14 with the improved emergency air relay valve 19 of this invention.

Line 20 connects valve 19 with trailer tank 21. Lines 22, 23 respectively connects valve 19 with trailer brake cylinders 24, 25.

Hand throttle 26 connects line 13 from tank 14 to service line 27 leading to two-way check valve 28. Foot throttle 29 connects line 13 to service line 30 leading to truck brake cylinders 31, 32 and check valve 28. Service line 33 including manual cut-off cock 34 and coupling 35 connects check valve 28 with valve 19.

It is understood that when the truck and trailer are separated hand cocks 17 and 34 are closed and couplings 18 and 35 are disconnected. In this case the truck is operated alone and the truck brakes are actuated by foot throttle 29 controlling the air supplied to cylinders 31, 32 from tank 14 through lines 13 and 30.

When both truck and trailer are used tank 21 is supplied with air from tank 14 through lines 13, 16, valve 19, and line 20. In this case foot throttle 29 controls both the truck and trailer brakes with service air for relay 19 being supplied through lines 13, foot throttle 29, lines 30, check valve 28, and line 33 to relay valve 19 which controls the air supply at throttle balanced pressure from tank 21 through line 20, valve 19, and lines 22, 23 to brake cylinders 24, 25.

The trailer brakes alone without the truck brakes can be controlled by hand throttle 26 bleeding air from line 13 to service line 33 through line 27 and check valve 39.

The construction and operation of our improved emergency air relay valve will now be explained with reference to Figure 2 showing a vertical section through our valve 19 viewed similarly to the elevation of valve 19 shown in Figure 1. It is seen that valve 19 includes a flexible diaphragm 40 sealed and secured between upper body casting 36 and lower body casting 37 by bolts 38. Service line connection 39 for service line 33 is formed in the top of upper body 36 and leads to the interior thereof above diaphragm 40. Trailer brake line connections 41, 42 for brake lines 22, 23, respectively, are formed on opposite sides of lower body 37 and lead to the interior thereof.

Exhaust valve port collar 43 with valve seat 44 formed thereon is counterbored on its upper side to receive the lower extension of exhaust sleeve 45 extending through a central hole in diaphragm 40. Cap screws 46 secure diaphragm 40 between collar 43 and flange 47 formed on sleeve 45. Vertically movable with diaphragm 40 sleeve 45 is slidably guided in cylindrical inward extension 48 of upper body 36. Inverted monitor cup 49 secured to upper body 36 by machine screws 50 clamps retainer 51 and O-ring 52 in place as shown to provide an air seal between upper body 36 and sleeve 45. Spring 54 abutting the perforated end of cup 49 as its upper end and supported on spring collar 53 biases sleeve 45, diaphragm 40 and exhaust valve seat 44 downward to a limiting position at which collar 53 abuts retainer 51. Nubs 55 formed on the upper end of monitor cup 49 hold spring washer 56 away from the perforations in the top of cup 49 to form an exhaust air passage to atmosphere. Cap 57 secured to cup 49 by screw 58 as shown provides silencing and dirt protection for the exhaust air passage.

Sealed centrally by O-ring 59 into lower body casting 37 to which it is secured by cap screws 60 as shown is valve cage 61 into which at its lower end valve guide 62 is sealed by O-rings 63, 64, 65 and secured by screws 69. Between O-rings 63 and 64, cage 61 and guide 62 are formed with an annular passage 66 therebetween connecting emergency line connection 67 with holes 68 formed through the wall of guide 62 to the interior thereof. Between O-rings 63 and 65 cage 61 and guide 62 are formed with an annular passage 70 therebetween connecting trailer tank line connection 71 with holes 72 formed through the wall of guide 62 to the interior thereof. Web 73 formed across guide 62 between holes 68 and holes 72 divide the interior of guide 62 into an upper space 74 and a lower space 75.

Cylindrical center bore 76 in web 73 forms a valve seat for O-ring check valve 77 carried on inlet valve stem 78 adapted to move axially with clearance through bore 76. Inlet valve piston 79 threadedly secured by nut 84 to valve stem 78 is freely movable along the cylindrical interior surface of guide 62 to which it is sealed by piston O-ring 86. Piston 79 with valve stem 78 is biased upwardly by coil spring 81 seated in spring cup 82 secured into guide 62 by C-washer 83. Protecting cover 85 is secured to guide 62 by screws 86 and is easily removable for vertical adjustment of nut 87 threaded onto the lower end of valve stem 78 to limit the upward movement thereof.

Axially slidable along and guided in cage 61 and guide 62 is valve box 88 sealed into guide 62 by O-ring 89. Coil spring 90 strained between box 88 and guide 62 biases box 88 upwardly. Formed interiorly of valve box 88 is inlet valve seat 91 adapted to cooperate with inlet valve 92 having resilient valve pad 93 set into disk 94 secured to stem 78 by C-washers 95, 96, washer 98, and sealed to stem 78 by O-ring 97. Closing the top of box 88 is exhaust valve 99 having resilient pad 100 set into disk 101 secured into box 88 by C-washer 102.

The interior space 103 within box 88 between inlet valve 92 and exhaust valve 99 communicates with space 104 under diaphragm 40 within lower body 37 through holes 105, 106 in box 88 and holes 107, 108 in cage 61.

To explain the operation of our improved emergency air relay valve it is assumed that the valve 19 is connected into the brake system of Figure 1 as above described and that the parts shown in Figure 2 are positioned as they would be with full pressure on both tanks 14 and 21 and with both throttle valves 26, 29 closed and therefore with all brakes released.

In complete inaction with no air pressure on either tank spring 81 would hold piston 79 and valve stem 78 in an upward position limited by nut 87 striking spring cup 82. Diaphragm 40 with the exhaust ports secured thereto would be biased by spring 54 to its extreme downward position limited by spring collar 53 striking retainer 51. Spring 90 would bias box 88 upward to a position limited by closure of exhaust valve 99 on seat 44.

When the compressor builds up pressure in truck tank 14, air from the compressor or tank 14 passes through lines 13 and 16 to relay valve emergency line connection 67, around the annular space 66, through holes 68 in guide 62 to space 75 where it is sealed against passage through bore, or continuity port, 76 by check valve 77. Pressure is thus built up in space 75 forcing piston 79 downward, closing inlet valve 92 on its seat 91 unseating exhaust valve 99 and withdrawing check valve 77 from bore 76. Air from space 75 then passes through bore 76 to space 74 and out through holes 72 and connection 71 to tank line 20 and trailer tank 21. In this way pressure in both tanks 14 and 21 are equalized at the full pressure for which the compressor is controlled and the valve parts are in the position shown in Figure 2.

Now if it is desired to set the trailer brakes either throttle 26 or 29 is opened and depending on the degree of throttle opening air under increasing pressure is released through service line 33 and connection 39 to the space 109 above diaphragm 40 within upper body casting 36. The air pressure in space 109 first depresses diaphragm 40 to close exhaust valve seat 44 against exhaust valve 99 and continues on to force valve 99 with valve box 88 downward against the bias of spring 90 until inlet valve seat 91 backs away from inlet valve 92 and air under pressure from the emergency line 16 and tank line 20 passes from space 74 to space 103 and out through holes 105, 106, 107 and 108 to space 104 and by connections 41, 42 and lines 22, 23 to trailer brake cylinders 24, 25. The emergency line pressure being greater than the service line pressure because the service line pressure depends on the throttle opening, the pressure in space 104 builds up and presses diaphragm 40 upward but the exhaust valve seat 44 does not leave exhaust valve 99 until the upward following movement of valve box 88 biased upwardly by spring 90 is arrested by the seating of inlet valve seat 91 on inlet valve 92. The mechanism thus provides an overlapping action of the inlet and exhaust valve since in either direction of motion the open valve must be closed before the closed valve can be opened. In the lapped position with both valves closed the pressures on the two sides of diaphragm 40 are substantially equal and balanced with the pressure applied to the brake cylinders substantially the same as the throttle pressure to the service line.

Then should the operator desire to increase the brake pressure he lets more air into the service line by opening the throttle farther thus increasing the pressure in space 109 to push inlet valve seat 91 away from valve 92 and admit more air to space 104 and the brake cylinders. Or if the operator desires to decrease the brake pressure he lets up on his throttle exhausting some air from space 109 and allowing exhaust seat 44 to raise off exhaust valve 99, thus exhausting some air from the brake cylinders and space 104 and out exhaust tube 45 and the spaces under washer 56 to atmosphere. In this action air is exhausted from space 104 until its pressure again equals the pressure in space 109 when the exhaust valve again closes.

Finally should the operator wish to release his brakes entirely, he merely moves his throttle to exhaust the air from the service line and space 109 down to atmospheric pressure and in the manner above described the brake line pressure and the pressure in space 104 is reduced to atmosphere.

The above-described normal use action of our valve is different in detail but similar in effect to other prior art valves used for this purpose but the emergency action of our valve is far different from that of the prior art valves and will now be explained. It should be remembered that prior art emergency valves known to us operate on a loss of pressure in the emergency line to impress the full pressure of the trailer tank on the brake cylinders to lock the trailer brakes as far as they are able to do so.

With the brake system using our valve, with the vehicle in normal operation, and with our valve parts in the positions shown in Figure 2, if for some reason the pressure in the emergency line drops the pressure in space 75 will drop thus reducing the pressure on valve piston 79 and allowing spring 81 to move check valve 77 into bore 76, thus isolating the emergency line and space 75 from the trailer tank line and space 74. Of course, as valve stem 78 moves upward, at about the time check valve 77 closes bore 76, exhaust valve 99 closes on its seat 44, and the further upward motion of stem 78 opens the inlet valve 92 to apply air pressure from trailer tank 21 and space 72 to space 104 and the brake cylinders.

Note that in this case there is no pressure on the service line or in space 109, so that the overlap, or both-closed, position of the inlet and exhaust valves is determined by the balance of the pressure of spring 54 pressing downwardly on the diaphragm and the upward pressure of the brake air in space 104 pressing upwardly on the diaphragm. The inlet valve will stay open, thus increasing the pressure in space 104, until the pressure in space 104 is sufficient to raise the diaphragm and exhaust valve seat 44 against the bias of spring 54 to a position to allow spring 90 to raise box 88 and close the inlet valve. The brake pressure at which the inlet valve closes is thus determined by the allowed upward movement of valve stem 78 by spring 81. Adjusting nut 87 is provided to pre-set this limit pressure of air to be supplied to the trailer brakes in emergency operation. Lowering nut 87 on stem 78 allows greater upward movement of inlet valve 92 and therefore requires greater air pressure in space 104 to move diaphragm 40, compress spring 54 farther and allow inlet valve seat 91 to close on valve 92. Raising nut 87 on stem 78 allows less upward movement of stem 78 and therefore requires less air pressure in space 104 to move diaphragm 40, and compress spring 54 sufficiently to allow inlet valve seat 91 to close on valve 92 and prevent further increase of brake pressure.

It is thus seen that while in normal operation the trailer brake pressure is completely under the control of the operator who by throttle operation can vary the brake pressure from nothing to full tank pressure, but in emergency operation our valve can be preset by adjusting nut 87 to limit the emergency pressure applied to the trailer brakes to any desired value.

After the emergency is over and air under pressure is again supplied to space 75 by the emergency line, piston 79 is forced downward, inlet valve 92 remains closed on its seat 91, exhaust valve 99 is opened from its seat 44, check valve 77 is withdrawn from bore 76, brake lines and space 104 are exhausted to atmosphere and full emergency line pressure is again applied to trailer tank 21, leaving the parts as shown in Figure 2 and ready for operation.

In addition to its unique operating features as above described it should be noted that the valve has novel and useful features of construction. By removing screws 69, guide 62 and substantially all of the working parts of the valve which might require inspection or other attention can be withdrawn in one sub-assembly group from cage 61 and replaced without breaking any of the vehicle air lines to the valve.

Also it should be noted that to hold spring 54 to a reasonable size as well as to reduce the required movement of diaphragm 40 in emergency operation and prevent overthrow and damage of parts, upper body casting is carefully formed on its underside to a convex annular shape. Upward movement of diaphragm 40 therefore wraps the diaphragm on the annular convex surface and reduces the effective area of the diaphragm as it moves upward, thus restricting the rate of increase of total pressure impressed on spring 54 as the pressure in space 104 is increased. In this way a large range of pressure is covered by a small diaphragm movement and a relatively small spring.

Having stated some of the objects of our invention, illustrated and described a preferred form in which our invention can be practiced and explained the operation thereof,

We claim:
1. In an emergency air relay valve for a trailer brake actuator of an automotive truck-trailer combination vehicle: a hollow guide member of generally cylindrical shape open at one end, a first barrier formed in said guide adapted to divide the interior thereof into a first space and a second space, said first barrier having a central first air port formed therethrough; a valve stem guided for axial movement with air conducting clearance through said first air port, means carried on said stem to close said first air port at one position of said stem; a first opening formed through the wall of said guide member adapted to connect said first space with a source of air; a second opening formed through the wall of said guide adapted to connect said second air space with an air storage means; a hollow generally cylindrical valve box open at one end slidably guided in said guide member for axial movement therealong, the open end of said box being open to said second space, a second barrier formed in said box adapted to form therein a third space separated from said second space, a hole formed in the wall of said box adapted to connect said third space with said air actuating means for a trailer brake, a brake inlet air port formed centrally through said second barrier, an inlet valve seat formed around said inlet air port, an inlet valve carried on said stem, said inlet valve and said inlet valve seat when closed one on the other being adapted to close said inlet air port; a first biasing means adapted to bias said valve box toward the closed position of said inlet valve seat on said inlet valve; a second biasing means adapted to bias said valve stem towards the open position of said inlet valve on said inlet valve seat; opposing means adapted variably to oppose both said biasing means to control the movement of said valve stem in response to a condition; and means adapted, when both said biasing means overcome said opposing means and move said stem to close said first air port in said first barrier, to limit the movement of said valve box by said first biasing means whereby further movement of said stem will raise said inlet valve from its seat and pass air from said second space to said third space to actuate said brake.

2. The device of claim 1 including adjustable means adapted to limit the movement of said valve stem in its inlet valve port opening direction.

3. The device of claim 1 in which said opposing means is responsive to the air pressure in said first space.

4. The device of claim 1 including an upper body member, a lower body member, a diaphragm sealed between said upper body member and said lower body member to divide the enclosure formed by said body members into a fourth space and a fifth space, means connecting said fourth space with said third space, means connecting said fifth space with a source of air under a modulated pressure, said guide member being sealed into the wall of said fourth space axially of said diaphragm, an exhaust port carried on said diaphragm adapted to connect said fourth space to atmosphere, an exhaust valve seat formed around said exhaust port in said fourth space, an exhaust valve carried on the closed end of said valve box exposed in said fourth space, a third biasing means adapted to bias said diaphragm toward the closed position of said exhaust valve seat on said exhaust valve, and means limiting the movement of said diaphragm by said third biasing means.

References Cited in the file of this patent
UNITED STATES PATENTS

| 2,289,559 | Turek | July 14, 1942 |
| 2,450,464 | Bent | Oct. 5, 1948 |
| 2,656,014 | Files | Oct. 20, 1953 |

FOREIGN PATENTS

| 639,201 | Germany | Dec. 1, 1936 |